L. F. STAFFORD.
BRACKET FOR MOUNTING AUTOMOBILE BUMPERS.
APPLICATION FILED MAR. 17, 1920.
1,368,464.
Patented Feb. 15, 1921.
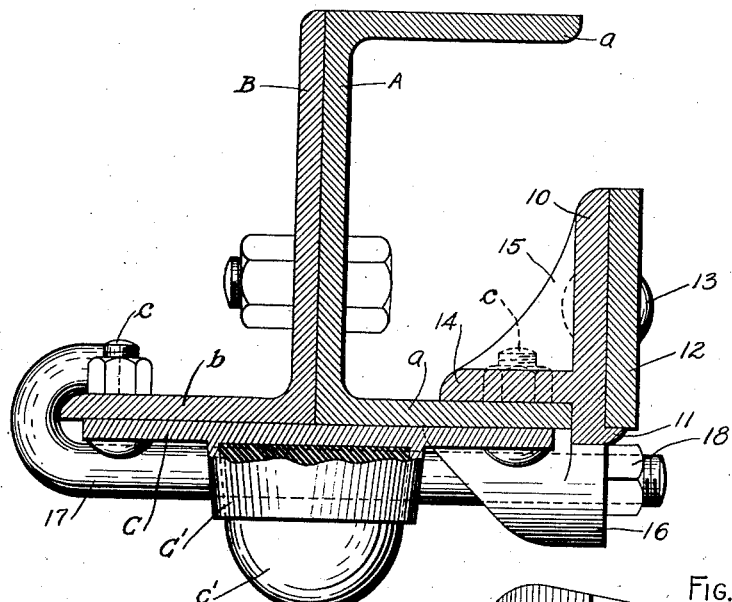
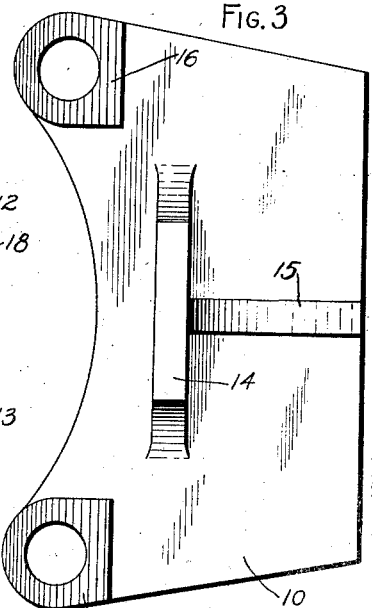
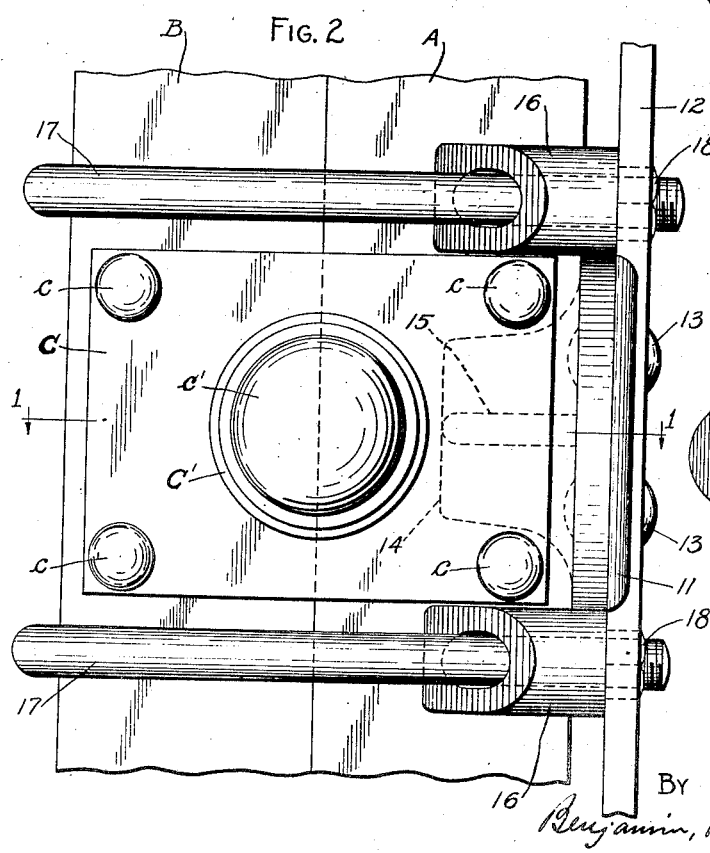
INVENTOR
LEWIS F. STAFFORD.
BY
ATTYS.

UNITED STATES PATENT OFFICE.

LEWIS F. STAFFORD, OF CHICAGO, ILLINOIS.

BRACKET FOR MOUNTING AUTOMOBILE-BUMPERS.

1,368,464. Specification of Letters Patent. Patented Feb. 15, 1921.

Application filed March 17, 1920. Serial No. 366,499.

*To all whom it may concern:*

Be it known that I, LEWIS F. STAFFORD, a citizen of the United States, residing at Chicago, in the county of Cook and State of Illinois, have invented a new and useful Improvement in Brackets for Mounting Automobile-Bumpers, of which the following is a specification.

My present invention has reference to means for attaching or securing the supporting arms of a spring guard or bumper to a vehicle, and has for its principal object the provision of a structure that is capable of being readily and quickly assembled with the sills of the chassis with which it is to be assembled. Another object of my invention resides in the fact that I provide an attaching structure that will coöperate with certain stock parts to be found upon well-known types of motor vehicles, whereby the coöperation of my bracket therewith renders a secure and rigid connection that is not liable to become loosened from the vibration of the vehicle and further requires no mechanical operations or alterations upon the parts for its attachment thereto. A still further object is the provision of a bracket and securing structure that comprise a minimum of parts whereby considerable labor and expense is eliminated, not alone in the assembly of the structure upon the guard or bumper, but in its attachment to the vehicle.

All the foregoing objects, as well as others which will appear after my invention is understood, I prefer to accomplish in substantially the manner hereinafter fully described, and reference will now be made to the accompanying drawings that form a part of this specification, in which Figure 1 is a transverse vertical section of my attaching structure mounted upon one of the sills of a motor vehicle chassis and adjacent the rear springs thereof, the section being indicated on line 1—1, Fig. 2.

Fig. 2 is a bottom plan view of the structure illustrated in Fig. 1.

Fig. 3 is a side elevation looking at the attaching side of the type of bracket I employ for mounting the rear guard or bumper.

In the drawings, I have, for convenience, employed similar reference characters to designate like parts throughout the divers views, and by referring, first, to Figs. 1 and 4, it will be seen the side-sill of the vehicle chassis is designated by the character A and comprises a piece of channel metal of substantially U-shape in cross-section disposed with the parallel flanges $a$ in a horizontal plane, while secured to the web of the channel in any suitable manner is an angle metal piece B the web whereof is substantially the height of the channel and has its flange $b$ positioned in the opposite direction to the lower flange of the channel. To the bottom of flange $b$ and lower flange $a$ a rectangular base C is secured by suitable headed bolts $c$, and centrally of said base is a hollow socket $C'$ in which a pad or cushion $c'$ rubber or similar material is held. The structure thus described typifies a well-known motor vehicle construction, the pad or cushion $c'$ being for the purpose of receiving the impact in the event the usual springs (not shown) are compressed so as to permit contact with the axle, and I have described this structure because of the fact that these elements are utilized in the adaptation of my bracket and securing means to this chassis.

The bracket I prefer to employ consists of a cast metal plate 10 that is of a substantially rectangular shape, although this conventional contour may be modified, as will be seen in Fig. 3, where I have slightly converged the end edges of the plate and have concaved the lower edge at the left side of this figure. This plate is substantially vertically disposed when in position, and upon the face thereof farthest from the chassis structure, I form a longitudinal rib 11 that provides a seat for the adjacent end of an arm 12 of the guard or bumper that is usually of strap metal and which is set vertically upon the rib and against the plate to which latter it is secured by rivets 13 or in any other suitable manner. From the opposite face of the plate projects a horizontally disposed lateral foot 14 extending longitudinally thereof that is reinforced and strengthened by bracing web 15 inclined upwardly from the outer portion of the foot toward the upper edge of the plate. Spaced below the horizontal plane of this foot and preferably at the lower opposite corners of the plate project short hollow stubs or sockets 16 that are adapted to receive the adjacent end portions of J-bolts 17, and I prefer to so position these stubs 16 that they will fit along the opposite edges of base C, hereinbefore described.

In mounting this structure on the chassis, the bracket is forced on the lower flange $a$ of the channel sill with foot 14 upon the upper surface, and the two stubs 16 engaging the under surface thereof so that base C is between said stubs and flange *a* between the foot or stubs, whereby movement longitudinally of the sill is prevented as well as a limited amount of lateral movement of the bracket. The hooked ends of the J-bolts are then engaged with the edge of the oppositely extended flange *b* of the chassis frame, while the threaded ends of said bolts are inserted through the bore of the stubs and are tightened and drawn into place by nuts 18 screwed thereon. This attaches the bracket with the guard or bumper arms carried thereby securely and rigidly to the chassis so that any impact received by the guard or bumper will be transmitted through arm 12 directly to the chassis frame without permitting the bracket to move or slip in any direction.

What I claim as new is:—

1. Means for mounting a guard or bumper upon a vehicle chassis comprising a plate to which said bumper is secured, members projecting laterally from said plate in spaced horizontal planes with respect to each other and between which a lateral element of said chassis is positioned, and clamping means extending through said plate and engageable with another portion of said chassis whereby said plate is securely held in position.

2. The combination with a chassis frame having sills of angular section, of means for mounting a guard or bumper thereon comprising a plate to which said bumper is secured, a lateral member projecting from said plate and resting upon the upper face of a flange of the sill, a second lateral member below the plane of said first lateral member engaging the under face of the frame, and clamping means extending through said plate and passed below said sill the opposite portion of said clamping means engageable with another projecting portion of the chassis frame.

3. A bracket for mounting a guard or bumper upon a vehicle chassis consisting of a vertically disposed plate to one face whereof an arm of the bumper is secured, a foot projecting laterally from the opposite face of said plate and above the lower edge thereof, and a member projecting from the lower portion of the plate in a horizontal plane of said foot, whereby an element of the chassis may be inserted between said foot and members.

4. A bracket for mounting a guard or bumper upon a vehicle chassis consisting of a vertically disposed plate, a longitudinal rib upon one face of said plate providing a shelf upon which an arm of the bumper is supported in contact with one face of said plate, a foot projecting laterally from the opposite face of said plate and above the lower edge thereof, and a member projecting from the lower portion of the plate in a horizontal plane of said foot, whereby an element of the chassis may be inserted between said foot and members.

5. The combination with a chassis frame having sills of angular section, of means for mounting a guard or bumper thereon comprising a plate to one face whereof said bumper is secured, a lateral member projecting from the opposite face of said plate, lateral hollow stubs extended from the lower portion of said plate in a plane below said lateral member whereby a flange of said sill is fitted between said member and stubs, and bolts having lateral ends that engage the opposite edge of said sill and the other ends whereof pass through said stubs and are clamped in place by nuts screwed on the outer ends thereof.

6. A bracket for mounting a guard or bumper upon a vehicle chassis consisting of a plate, a foot projecting from one face thereof, hollow stubs upon the lower corner portions of said plate between which and said foot a portion of said chassis is fitted, and bolts fitting said studs the other ends whereof have lateral members to engage another portion of said chassis.

Signed at Chicago, county of Cook and State of Illinois, this 23d day of February, 1920.

LEWIS F. STAFFORD.

Witness:
E. K. LUNDY, Jr.